US011153111B1

(12) United States Patent
DeLuca

(10) Patent No.: US 11,153,111 B1
(45) Date of Patent: Oct. 19, 2021

(54) RENAMING OF WEB CONFERENCE EMAILS BASED ON CORRESPONDING CALENDAR ENTRIES

(71) Applicant: INTERNATIONAL BUSINESS MACHINES CORPORATION, Armonk, NY (US)

(72) Inventor: Lisa Seacat DeLuca, Baltimore, MD (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/082,623

(22) Filed: Oct. 28, 2020

(51) Int. Cl.
*G06F 15/16* (2006.01)
*H04L 12/18* (2006.01)
*H04L 12/58* (2006.01)

(52) U.S. Cl.
CPC ...... *H04L 12/1831* (2013.01); *H04L 12/1818* (2013.01); *H04L 51/08* (2013.01)

(58) Field of Classification Search
None
See application file for complete search history.

(56) References Cited

U.S. PATENT DOCUMENTS

| 5,572,728 | A | 11/1996 | Tada |
| 8,266,119 | B2 | 9/2012 | Murata |
| 8,621,373 | B2 | 12/2013 | Burtner |
| 8,645,430 | B2 | 2/2014 | Khouri |
| 9,253,330 | B2 | 2/2016 | Boss |
| 9,705,691 | B2* | 7/2017 | Tripathi ................. H04L 67/148 |
| 2007/0005691 | A1* | 1/2007 | Pushparaj ......... H04M 3/42221 709/204 |
| 2007/0112926 | A1 | 5/2007 | Brett |
| 2009/0016513 | A1 | 1/2009 | Miller |
| 2010/0158232 | A1 | 6/2010 | Sylvain |
| 2010/0173618 | A1 | 7/2010 | Kass |
| 2011/0040834 | A1* | 2/2011 | Schaefer .............. G06Q 10/109 709/204 |
| 2011/0137988 | A1 | 6/2011 | Balogh |

(Continued)

OTHER PUBLICATIONS

Mell, et al., "The NIST Definition of Cloud Computing," National Institute of Standards and Technology, U.S. Department of Commerce, Special Publication 80-145, Sep. 2011, pp. 1-7.

(Continued)

*Primary Examiner* — Phyllis A Book
(74) *Attorney, Agent, or Firm* — Kenneth Han

(57) ABSTRACT

A method, computer system, and computer program product for modifying an email associated with a meeting replay are provided. The embodiment may include associating a meeting with a web conference. The embodiment may also include monitoring a user email client for a receipt of an email containing a recording and detail of the recording after the web conference ends. The embodiment may further include extracting information from the received email containing a recording and detail of the recording. The embodiment may also include matching information extracted from the received email with calendar entries of a calendar of the user to match the email with the web conference. The embodiment may further include determining a matching confidence score based on overlaps of the information extracted from the email and the calendar entries.

20 Claims, 7 Drawing Sheets

(56) References Cited

U.S. PATENT DOCUMENTS

| | | | |
|---|---|---|---|
| 2011/0320958 A1* | 12/2011 | Kashi | G06Q 10/1095 715/751 |
| 2012/0296914 A1 | 11/2012 | Romanov | |
| 2013/0144603 A1 | 6/2013 | Lord | |
| 2013/0325972 A1 | 12/2013 | Boston | |
| 2014/0035949 A1 | 2/2014 | Rajan | |
| 2014/0229218 A1 | 8/2014 | Abuelsaad | |
| 2015/0012844 A1 | 1/2015 | Paulik | |
| 2015/0058425 A1 | 2/2015 | Nathan | |
| 2015/0081806 A1 | 3/2015 | Kanuturi | |
| 2015/0134748 A1 | 5/2015 | Zhang | |
| 2015/0181020 A1* | 6/2015 | Fitzsimmons | H04M 3/42221 379/67.1 |
| 2015/0249747 A1* | 9/2015 | Boss | H04M 3/42221 379/85 |
| 2016/0005005 A1 | 1/2016 | Dhara | |
| 2016/0104094 A1 | 4/2016 | Yom-Tov | |
| 2016/0234268 A1 | 8/2016 | Ouyang | |
| 2016/0236547 A1 | 8/2016 | Wojdyla et al. | |
| 2016/0269449 A1 | 9/2016 | Modai | |
| 2017/0064254 A1 | 3/2017 | Mueller | |
| 2018/0191907 A1* | 7/2018 | Herrin | H04M 3/568 |
| 2019/0052660 A1* | 2/2019 | Cassidy | G06F 21/54 |
| 2019/0073640 A1* | 3/2019 | Udezue | H04L 12/1818 |
| 2019/0074987 A1 | 3/2019 | Wiener | |
| 2019/0075069 A1 | 3/2019 | Kumar | |
| 2020/0005247 A1 | 1/2020 | Thomas | |
| 2020/0005248 A1* | 1/2020 | Gerzi | G06Q 10/1095 |
| 2020/0112450 A1* | 4/2020 | Chhabra | H04L 65/1069 |
| 2020/0412561 A1 | 12/2020 | DeLuca | |
| 2021/0058263 A1* | 2/2021 | Fahrendorff | H04L 67/306 |

OTHER PUBLICATIONS

IBM, List of IBM Patents or Patent Applications Treated As Related, Appendix P, dated May 18, 2021, 2 pages.

* cited by examiner

RENAMING OF WEB CONFERENCE EMAILS BASED ON CORRESPONDING CALENDAR ENTRIES

BACKGROUND

The present invention relates, generally, to the field of computing, and more particularly to web conferencing systems.

Web conferencing systems allow users to hold live meetings, training events, lectures, or presentations through a web conferencing system on TCP/IP connections. Web conferencing systems also allow data streams of text-based messages and voice and video chat to be shared simultaneously. Users can connect to the web conferencing system by telephone or using a user computer's speakers and microphone through a VoIP connection. Often, web conferences are recorded on the user side or server-side for later viewing or distribution using a software or a web-based application. Recordings may be saved in the cloud or on a user computer. For example, if a user uses cloud recording, the recording will be automatically saved online and related information may be accessed on the user's meeting history page.

SUMMARY

According to one embodiment, a method, computer system, and computer program product for modifying an email associated with a meeting replay are provided. The embodiment may include associating a meeting with a web conference. The embodiment may also include monitoring a user email client for a receipt of an email containing a recording and detail of the recording after the web conference ends. The embodiment may further include extracting information from the received email containing a recording and detail of the recording. The embodiment may also include matching information extracted from the received email with calendar entries of a calendar of the user to match the email with the web conference. The embodiment may further include determining a matching confidence score based on overlaps of the information extracted from the email and the calendar entries. The embodiment may also include, in response to the matching confidence score exceeding a preconfigured confidence score, modifying a subject of the received email, and a body of the received email to include a description of the associated meeting with the web conference, thereby creating a modified email.

BRIEF DESCRIPTION OF THE SEVERAL VIEWS OF THE DRAWINGS

These and other objects, features, and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
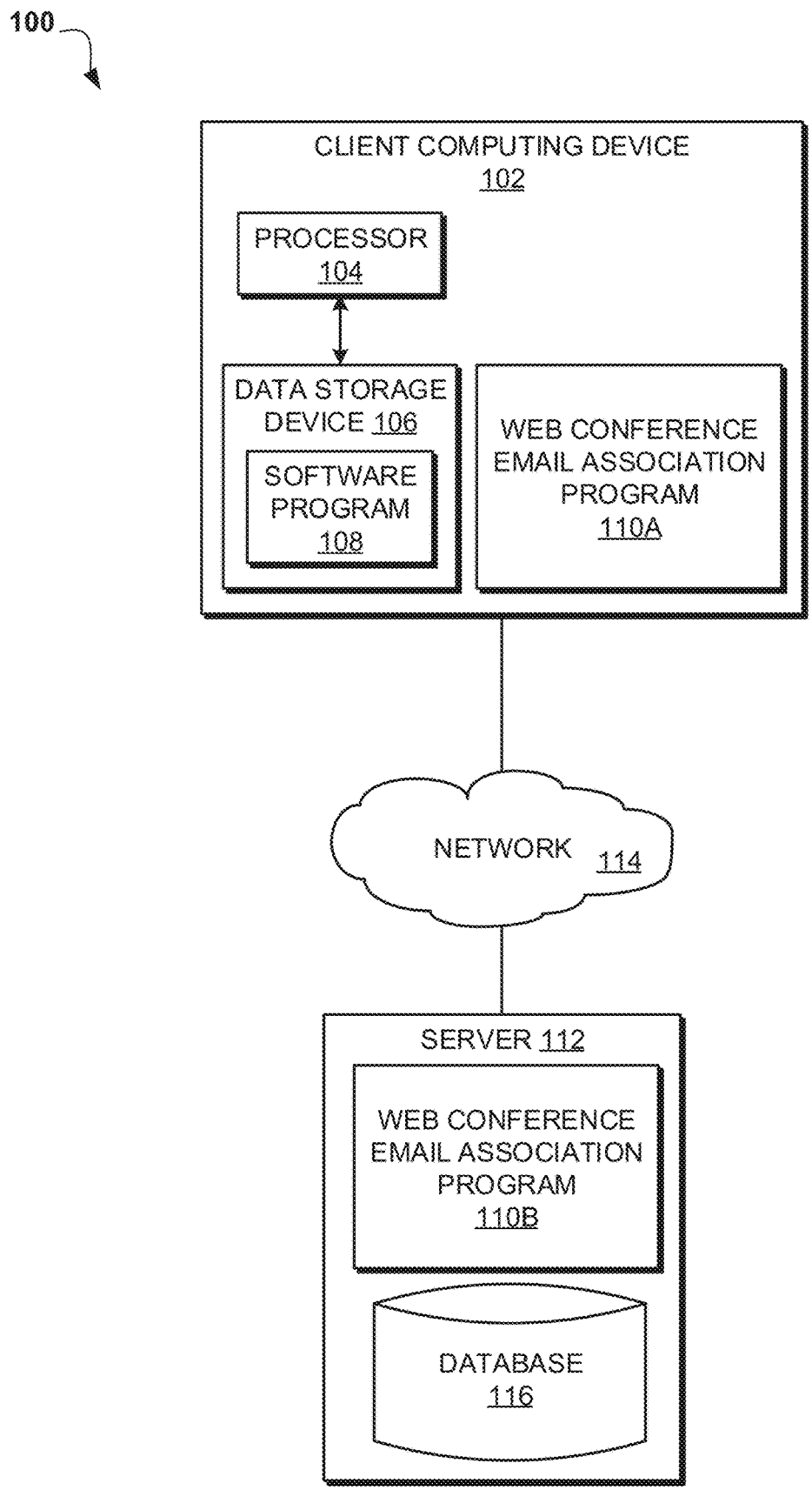
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to web conferencing systems. The following described exemplary embodiments provide a system, method, and program product to modify an email associated with a meeting replay with extracted contextually relevant calendar entries for meeting association. Therefore, the present embodiment has the capacity to improve the technical field of web conferencing systems by promptly allowing users to identify contextual information found in the modified email to confirm with which meeting or web conference the email and the replay information was associated.

As previously described, the web conferencing systems allow users to hold live meetings, training events, lectures, or presentations through a web conferencing system on TCP/IP connections. Web conferencing systems also allow data streams of text-based messages and voice and video chat to be shared simultaneously. Users can connect to the web conferencing system by telephone or using a user computer's speakers and microphone through a VoIP connection. Often, web conferences are recorded on the user side or server-side for later viewing or distribution using a software or a web-based application. Recordings may be saved in the cloud or on a user computer. For example, if a user uses cloud recording, the recording will be automatically saved online and related information may be accessed on the user's meeting history page.

Many employees are moving towards web conferencing tools or applications for collaborative meetings. Often, these web conferences are recorded. Today, the meeting host will receive an email with the replay information associated with the collaborative meeting. The email subject may state: "Your collaborative meeting recording is available for viewing". However, as many employees may participate in many numbers of web conferences on a given day, it may typically require the moderator to look back at their calendar to associate an event with the recording. Moreover, the recording may take minutes to hours to be sent to a participant's email address. Typical emails have little or no contextual information to help a participant to understand which meeting it was. Most of the time a web conference is recorded because it needs to be shared with someone who could not attend the live meeting or a wider audience. If the wrong web conference is shared, it may embarrass the forwarder, or worse, allow someone who is not intended to view a potentially confidential recording. As such, it would be advantageous to implement a system capable of associating emails that are related to replayed web conferencing tools with a corresponding meeting where applicable.

According to one embodiment, the present invention may record a web meeting and parse information related to the receipt of the recording within an email. In at least one other embodiment, the present invention may also automatically match the email with the associated event based on calendar entries. The present invention may further determine a confidence score based on the overlap of information extracted from the email and the calendar entries, such that the email is renamed if the confidence score exceeds a preconfigured threshold.

The present invention may be a system, a method, and/or a computer program product at any possible technical detail level of integration. The computer program product may include the computer readable storage medium (or media) having computer readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer-readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or another device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product for the renaming of web conference emails based on corresponding calendar entries.

Referring to FIG. 1, an exemplary networked computer environment 100 is depicted according to at least one embodiment. The networked computer environment 100 may include client computing device 102 and a server 112 interconnected via a communication network 114. According to at least one implementation, the networked computer environment 100 may include a plurality of client computing devices 102 and servers 112 of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a web conference email association program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 5, the client computing device 102 may include internal components 502a and external components 504a, respectively.

The server computer 112 may be a laptop computer, netbook computer, personal computer (PC), a desktop computer, or any programmable electronic device or any network of programmable electronic devices capable of hosting and running a web conference email association program 110B and a database 116 and communicating with the client computing device 102 via the communication network 114, in accordance with embodiments of the invention. As will be discussed with reference to FIG. 5, the server computer 112 may include internal components 502b and external components 504b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the web conference email association program 110A, 110B may be a program capable of extracting key information from a user email or calendar associated with a recorded web meeting and updating or modifying email information in accordance with the replay information of the recorded web meeting. The web conference email association process is explained in further detail below with respect to FIG. 2.

Figure 2:
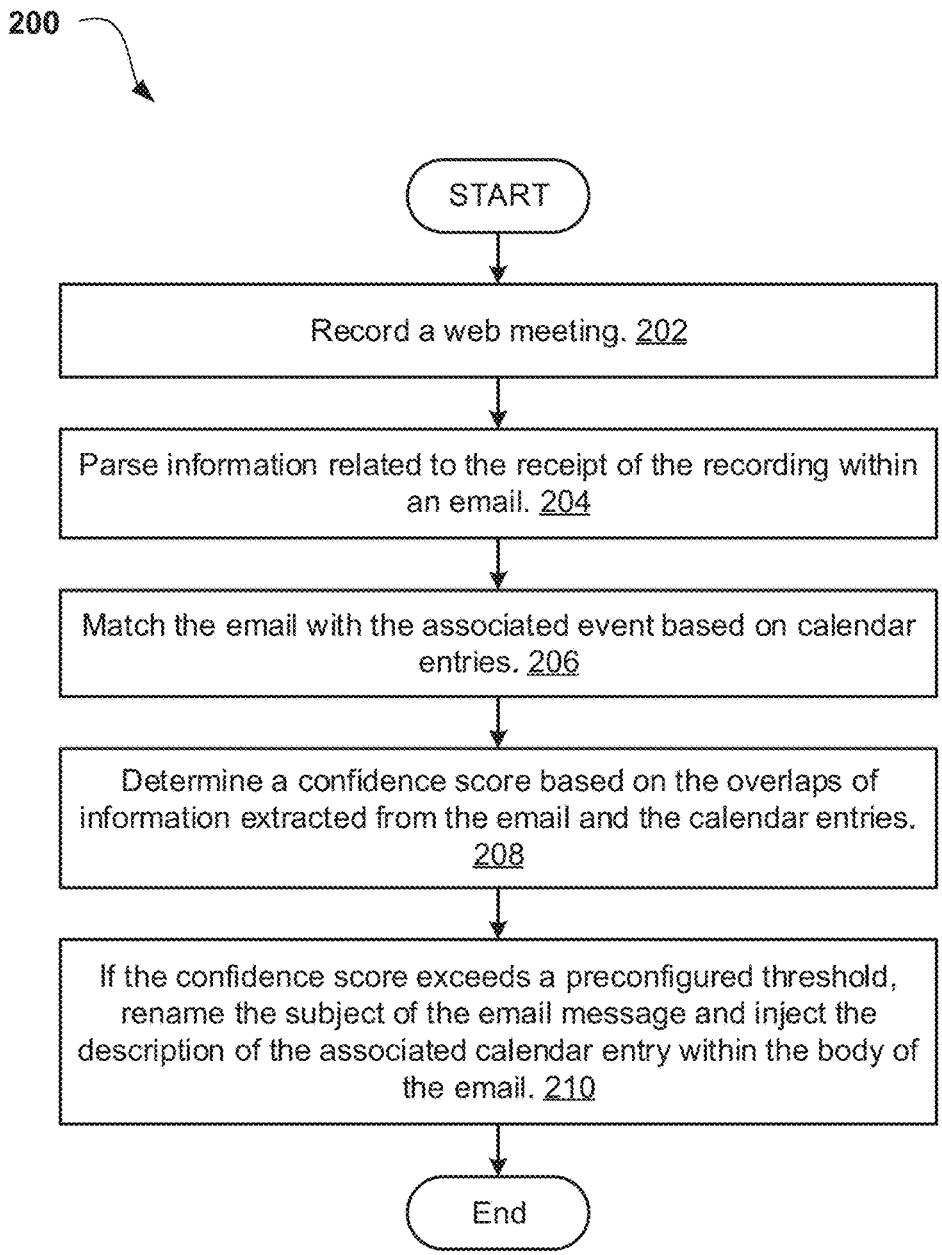
FIG. 2 is an operational flowchart illustrating a web conference email association process according to at least one embodiment.

Referring to FIG. 2, an operational flowchart illustrating a web conference email association process 200 is depicted according to at least one embodiment. At 202, the web conference email association program 110A, 110B records a web meeting. According to one embodiment, the web conference email association program 110A, 110B may record a web meeting in either audio or video format depending on a user selection. In at least one other embodiment, the web conference email association program 110A, 110B may ingest documents shared during a web meeting, such as word processing or text documents, spreadsheets, presentations, images, PDFs, videos, or maps and attach said files to the recording.

At 204, the web conference email association program 110A, 110B parses information related to the receipt of the recording within an email. According to one embodiment, the web conference email association program 110A, 110B may monitor for the receipt of the meeting recording details. For example, a user may receive an email with a notification stating that the meeting recording is available for viewing. In the alternative, a user may receive notification of an updating of the available recording on a web conferencing system. The web conference email association program 110A, 110B may also access and monitor a user's calendar application or online calendar to pinpoint a specific meeting taking place and check the date and the time when the meeting is scheduled for. In at least another embodiment, the web conference email association program 110A, 110B may further parse other meeting invitation information received from chat applications or instant messaging programs.

At 206, the web conference email association program 110A, 110B matches the mail with the associated event based on calendar entries. According to one embodiment, the web conference email association program 110A, 110B may extract various information for matching, such as the timestamp of the email, end time of the calendar event, length of the recording, length of the scheduled calendar event, and web conference URL, etc. In another embodiment, the web conference email association program 110A, 110B may also extract certain important information from user emails or calendar entries associated with the recorded meeting. For example, if a user A is invited to attend a meeting related to project A and the user A email invite or calendar invite contains a title "project A meeting", the web conference email association program 110A, 110B may extract such title to update the replay information in later steps. In at least one other embodiment, the web conference email association program 110A, 110B may utilize a known voice recognition technique to extract the same key information from the recording when such information is not available at the outset.

At 208, the web conference email association program 110A, 110B determines a confidence score based on the overlap of information extracted from the email and the calendar entries. According to one embodiment, the web conference email association program 110A, 110B may determine a confidence score of an email based on the information the web conference email association program 110A, 110B parsed in step 206. For example, assume the timestamp of the email indicates that it was received at 10:48 a.m., after a meeting ended, the calendar event indicates that the event started at 10:30 a.m., and the length of the scheduled calendar event was for 30 minutes. Also, the length of the recording is 28 minutes long. Based on the above information, the web conference email association program 110A, 110B may determine that the email is not associated with the recording or the calendar event as it is impossible to receive an email with a replay file 18 minutes after the meeting started. In this scenario, the web conference email association program 110A, 110B may assign a low matching confidence score which does not exceed a preconfigured threshold score.

At 210, the web conference email association program 110A, 110B renames the subject of the email message and injects the description of the associated calendar entry within the body of the email if the confidence score exceeds a preconfigured threshold. In the above example, if the email's receipt time indicates 11:05 a.m., the web conference email association program 110A, 110B may assign a confidence score that exceeds the preconfigured threshold. For example, a 30-minute meeting is likely associated with a 30-minute-long recording, whereas a 60-minute meeting may be associated with a 58-minute-long recording. Further, a meeting that ended at noon may be likely associated with an email that was sent at 12:30 p.m., not emails about a web conference recording that were received at 11:45 a.m. or 1:30 p.m. In at least one other embodiment, the web conference email association program 110A, 110B may also determine who is hosting a web conference and disregard emails or forwarded notes that are not addressed to the correct moderator or host of the web meeting.

According to one embodiment, the web conference email association program 110A, 110B may rename the subject of the mail message to be the subject of the calendar entry and extract the description of the calendar entry and inject it within the body of the web conference replay email. In another embodiment, the web conference email association program 110A, 110B may forward the email to participants of the calendar event or participants who did not attend the calendar event but who were invited. In at least one other embodiment, the web conference email association program 110A, 110B may identify an individual who did not attend the calendar event but who was invited by analyzing the individual's event responses (e.g. Accept/Decline/Tentative). In yet another embodiment, the web conference email association program 110A, 110B may include a link in the body of the email to the calendar entry and vice versa.

Figure 3A:
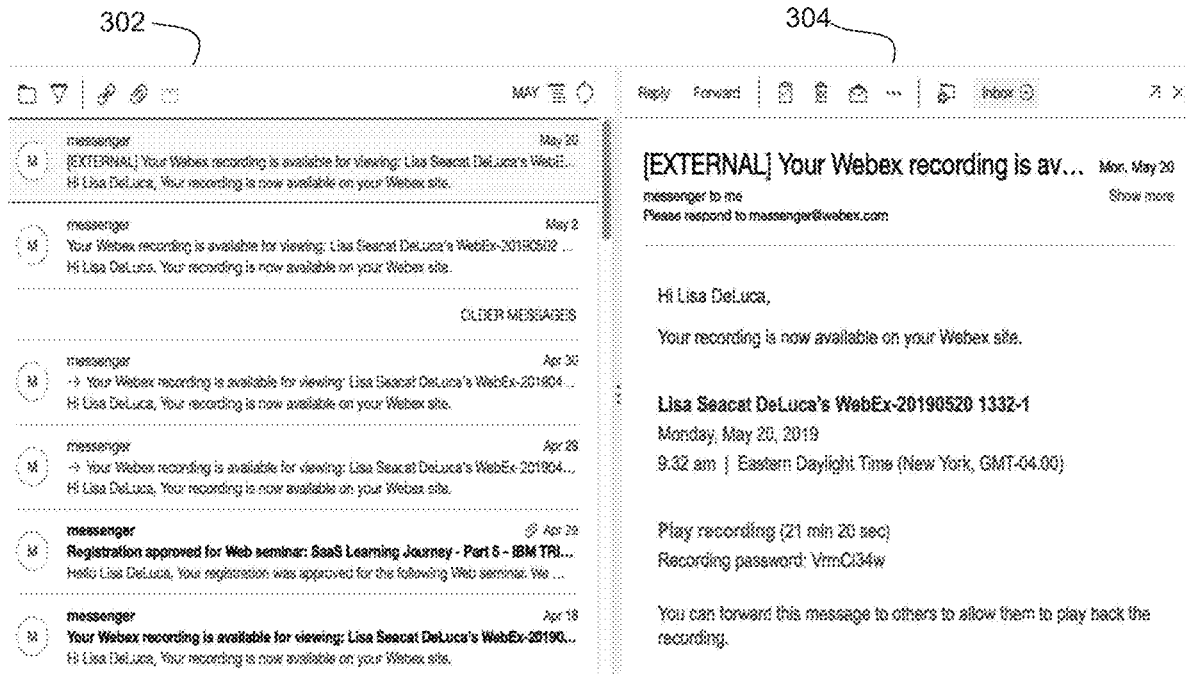
FIGS. 3A-3B are exemplary diagrams depicting a web conference email association process according to at least one embodiment.

Referring now to FIG. 3A, an exemplary diagram depicting a portion of the emails which a user may receive in connection with a calendar event or a collaborative meeting event is depicted according to at least one embodiment. According to one embodiment, inbox 302 may represent a user's typical email inbox containing emails related to collaborative meeting recordings. Email 304 may represent a detailed email as to the recorded meeting for the user. In the original body of the email 304, there is no indication of detailed information as to the recording on the given date.

Figure 3B:
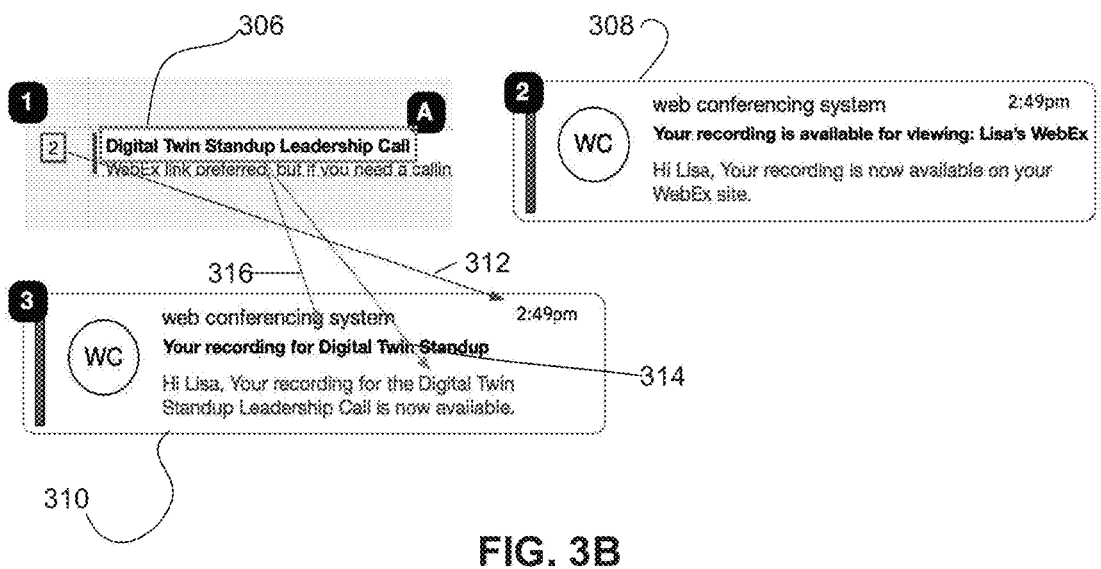

Referring to FIG. 3B, an exemplary diagram depicting how an incoming email message is matched to a calendar event is depicted according to one embodiment. According to one embodiment, the web conference email association program 110A, 110B may extract information from the calendar event 306 to extract information 312, information 314, and information 316. For example, the user's 2 p.m. "Digital Twin Standup Leadership call(A)" is recorded with the user's web conferencing system in email 308. In at least one embodiment, the web conference email association program 110A, 110B may update the email 308 by updating the title based on the information 316 and injecting the information 314 into the body of email 310. the web conference email association program 110A, 110B may also add information 312 relating to the time of the event from the calendar event 306 to email 310.

Figure 4:
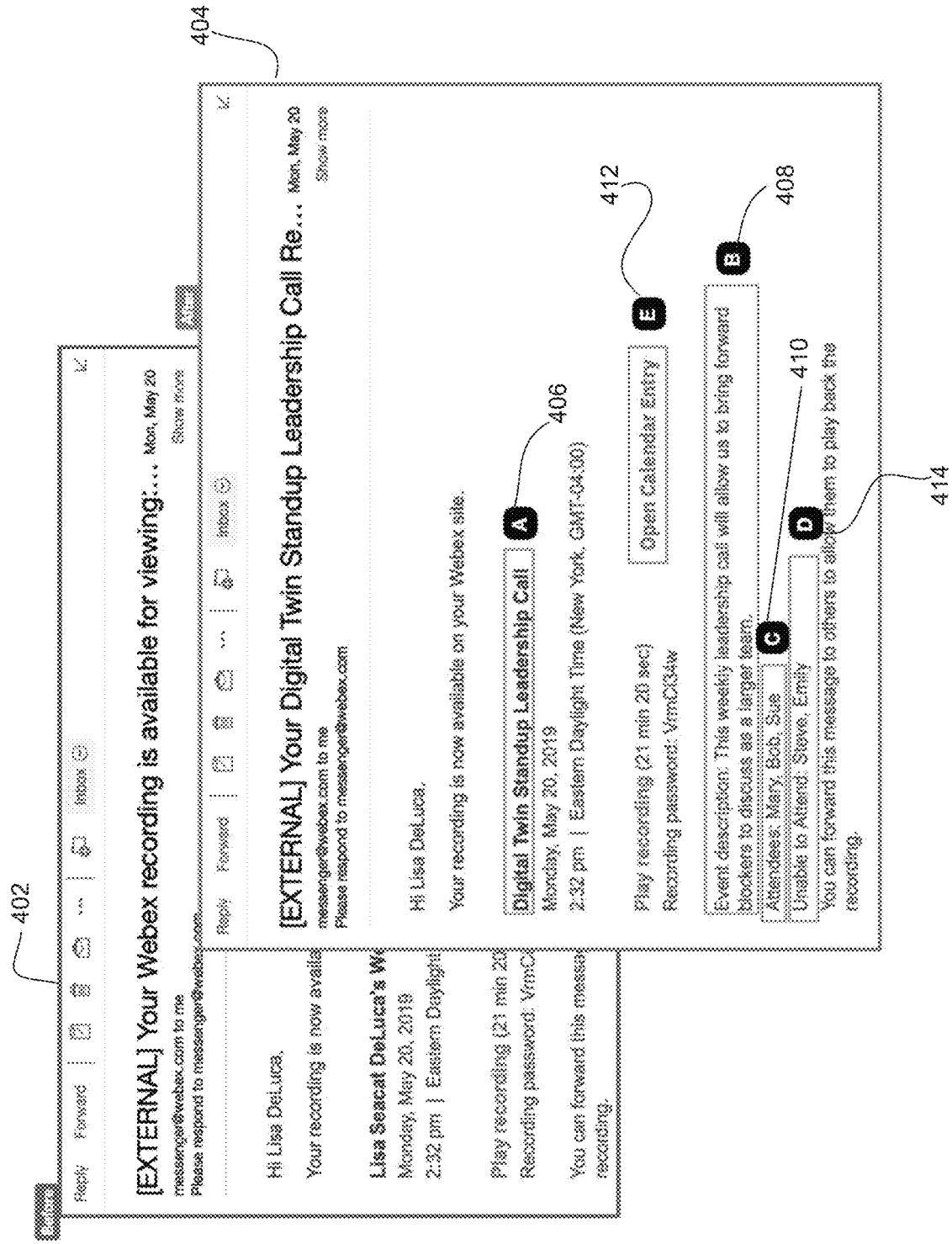
FIG. 4 is an exemplary diagram depicting an email processed with a web conference email association program according to at least one embodiment.

Referring now to FIG. 4, an exemplary diagram depicting a more detailed view of the updated web conference email is depicted according to at least one embodiment. Email 402 may represent a user's email before the web conference email association program 110A, 110B updates any information. For example, the title of the email does not indicate which recording is available to the user. Email 404 is the email with the updated information 406, information 408, information 410, information 412, and information 414. In at least one embodiment, the web conference email association program 110A, 110B may update the email based on the information 406 which indicates the title of the calendar event, the information 408 which indicated the description of the event, the information 410 which indicates a list of attendees, the information 412 which provides a link to open the calendar entry and the information 414 which lists individuals who could not make the meeting.

It may be appreciated that FIGS. 2-4 provide only an illustration of one implementation and do not imply any limitations with regard to how different embodiments may be implemented. Many modifications to the depicted environments may be made based on design and implementation requirements. For example, in at least one embodiment, the web conference email association program 110A, 110B may share a replay link, password, and other details within a web service for any other subscribers who were not originally invited to the meeting. The web conference email association program 110A, 110B may also ask the host of a meeting how or if the host wants to share the replay information.

Figure 5:
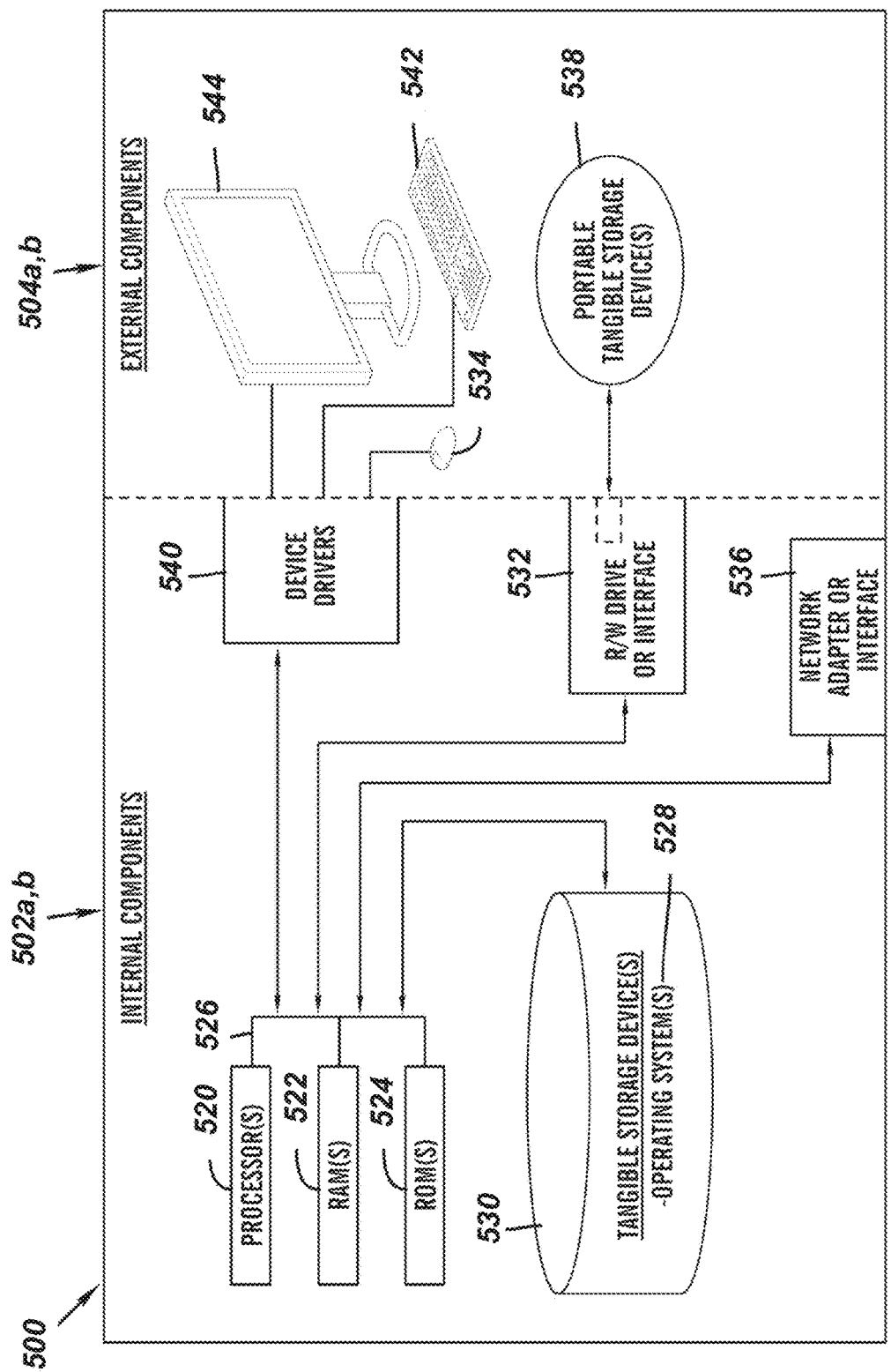
FIG. 5 is a block diagram of internal and external components of computers and servers depicted in FIG. 1 according to at least one embodiment.

FIG. 5 is a block diagram of internal and external components of the client computing device 102 and the server 112 depicted in FIG. 1 in accordance with an embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

The data processing system 502, 504 is representative of any electronic device capable of executing machine-readable program instructions. The data processing system 502, 504 may be representative of a smartphone, a computer system, PDA, or other electronic devices. Examples of computing systems, environments, and/or configurations that may be represented by the data processing system 502, 504 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The client computing device 102 and the server 112 may include respective sets of internal components 502 *a,b*, and external components 504 *a,b* illustrated in FIG. 5. Each of the sets of internal components 502 includes one or more processors 520, one or more computer-readable RAMs 522, and one or more computer-readable ROMs 524 on one or more buses 526, and one or more operating systems 528 and one or more computer-readable tangible storage devices 530. The one or more operating systems 528, the software program 108 and the web conference email association program 110A in the client computing device 102 and the web conference email association program 110B in the server 112 are stored on one or more of the respective computer-readable tangible storage devices 530 for execution by one or more of the respective processors 520 via one or more of the respective RAMs 522 (which typically include cache memory). In the embodiment illustrated in FIG. 5, each of the computer-readable tangible storage devices 530 is a magnetic disk storage device of an internal hard drive. Alternatively, each of the computer-readable tangible storage devices 530 is a semiconductor storage device such as ROM 524, EPROM, flash memory, or any other computer-readable tangible storage device that can store a computer program and digital information.

Each set of internal components 502 a,b also includes an R/W drive or interface 532 to read from and write to one or more portable computer-readable tangible storage devices 538 such as a CD-ROM, DVD, memory stick, magnetic tape, magnetic disk, optical disk or semiconductor storage device. A software program, such as the web conference email association program 110A, 110B can be stored on one or more of the respective portable computer-readable tangible storage devices 538, read via the respective R/W drive or interface 532, and loaded into the respective hard drive 530.

Each set of internal components 502 a,b also includes network adapters or interfaces 536 such as a TCP/IP adapter cards, wireless Wi-Fi interface cards, or 3G or 4G wireless interface cards or other wired or wireless communication links. The software program 108 and the web conference email association program 110A in the client computing device 102 and the web conference email association program 110B in the server 112 can be downloaded to the client computing device 102 and the server 112 from an external computer via a network (for example, the Internet, a local area network or other, wide area network) and respective network adapters or interfaces 536. From the network adapters or interfaces 536, the software program 108 and the web conference email association program 110A in the client computing device 102 and the web conference email association program 110B in the server 112 are loaded into the respective hard drive 530. The network may comprise copper wires, optical fibers, wireless transmission, routers, firewalls, switches, gateway computers and/or edge servers.

Each of the sets of external components 504 a,b can include a computer display monitor 544, a keyboard 542, and a computer mouse 534. External components 504 a,b can also include touch screens, virtual keyboards, touch pads, pointing devices, and other human interface devices. Each of the sets of internal components 502 a,b also includes device drivers 540 to interface to computer display monitor 544, keyboard 542, and computer mouse 534. The device drivers 540, R/W drive or interface 532, and network adapter or interface 536 comprise hardware and software (stored in storage device 530 and/or ROM 524).

It is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is a service oriented with a focus on statelessness, low coupling, modularity, and semantic interoperability. At the heart of cloud computing is an infrastructure comprising a network of interconnected nodes.

Figure 6:
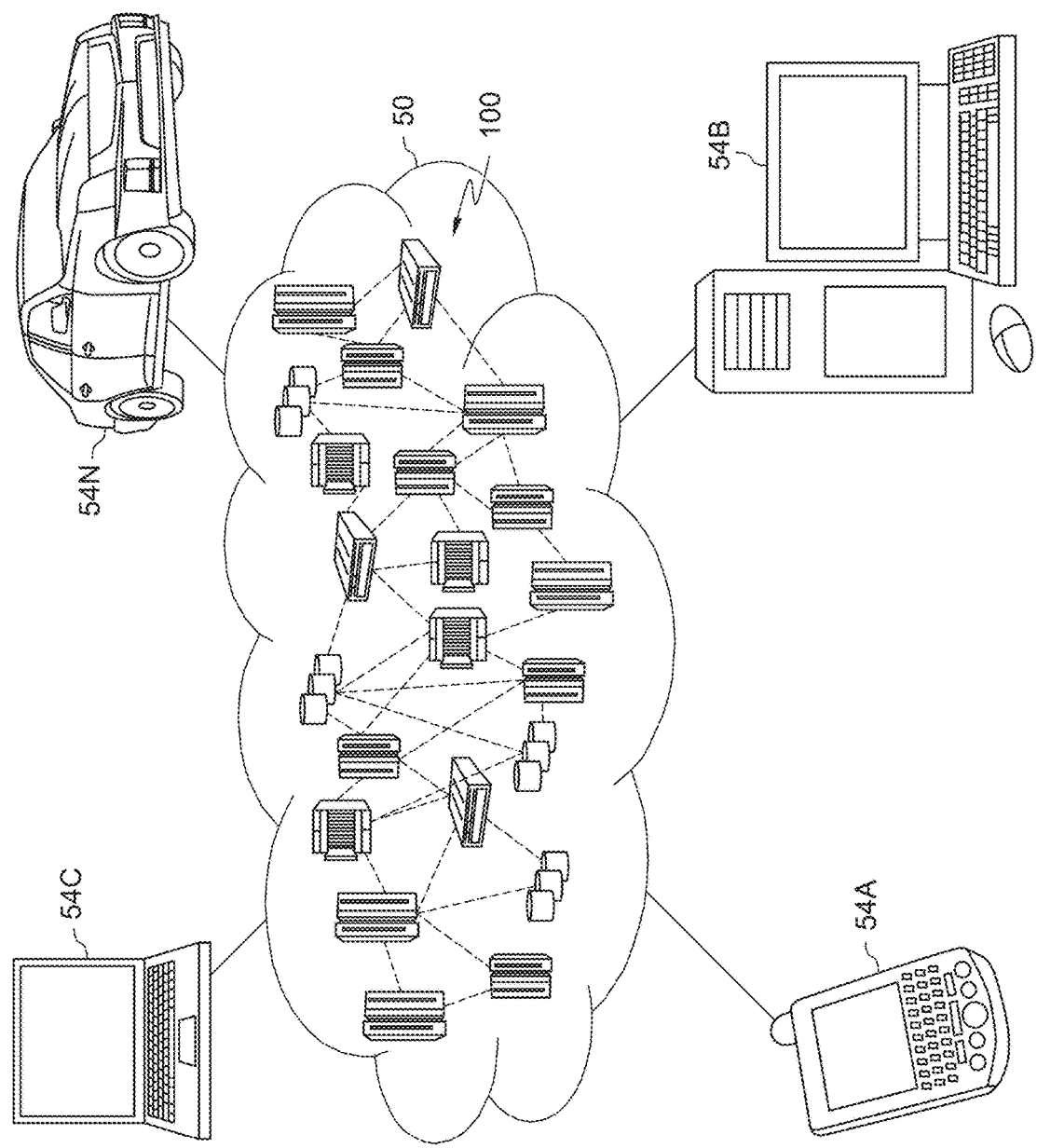
FIG. 6 depicts a cloud computing environment according to an embodiment of the present invention.

Referring now to FIG. 6, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 100 and cloud computing environment 50 can communicate with any type of computerized device over any type of network and/or network addressable connection (e.g., using a web browser).

Figure 7:
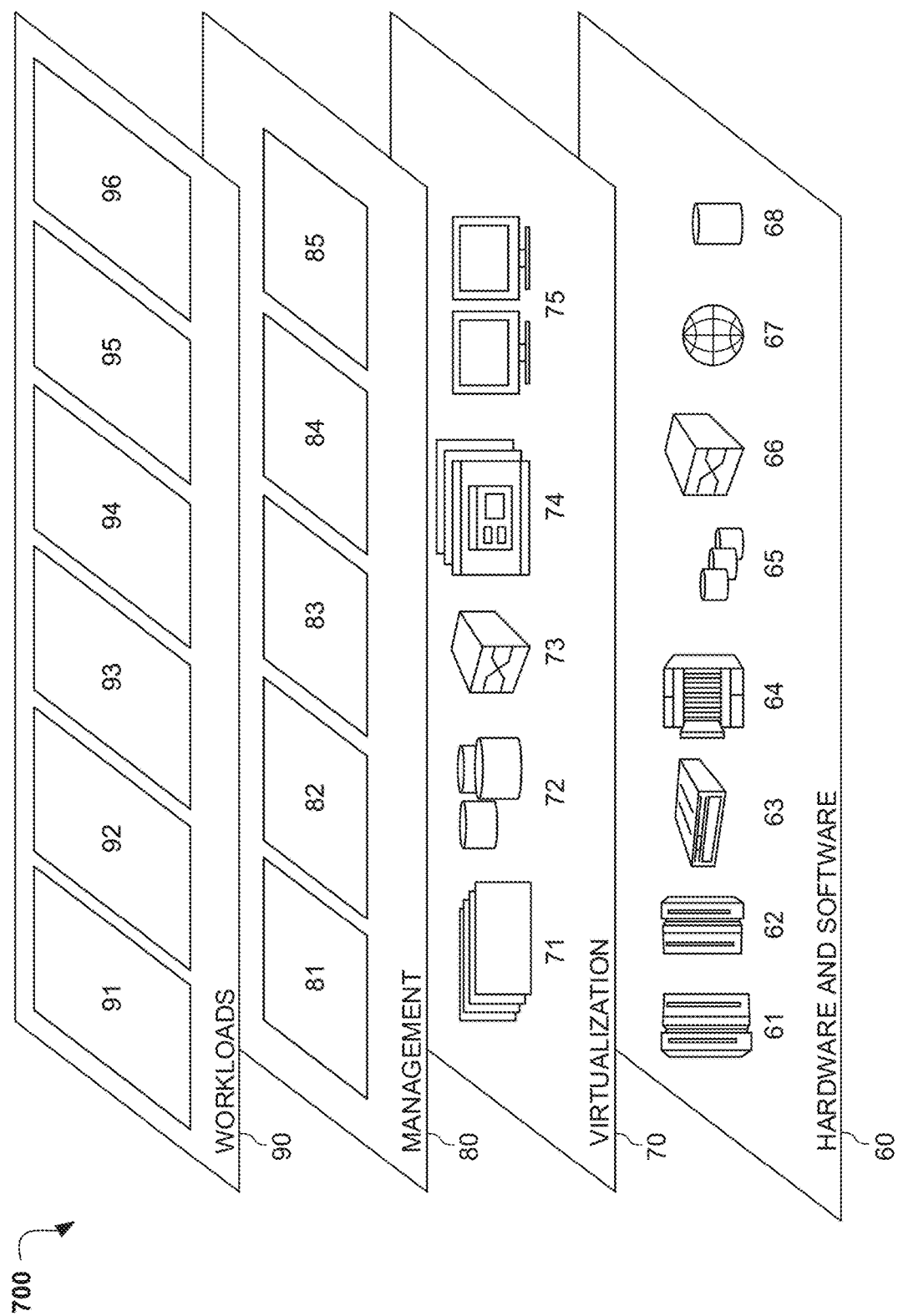
FIG. 7 depicts abstraction model layers according to an embodiment of the present invention.

Referring now to FIG. 7, a set of functional abstraction layers 700 provided by cloud computing environment 50 is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and web conference email association 96. Web conference email association 96 may relate to modifying an email associate with a meeting replay with extracted contextually relevant calendar entries for meeting association.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for modifying an email associated with a meeting replay, the method comprising:
   associating a meeting with a web conference;
   monitoring a user email client for a receipt of an email containing a recording and detail of the recording after the web conference ends;
   extracting information from the received email containing a recording and detail of the recording;
   matching information extracted from the received email with calendar entries of a calendar of the user to match the email with the web conference;
   determining a matching confidence score based on overlaps of the information extracted from the email and the calendar entries; and
   in response to the matching confidence score exceeding a preconfigured confidence score, modifying a subject of the received email and a body of the received email to include a description of the associated meeting with the web conference, thereby creating a modified email.

2. The method of claim 1, further comprising:
   forwarding the modified email to participants of the associated meeting.

3. The method of claim 1, further comprising:
   forwarding the modified email to participants who did not attend the associated meeting but who were invited.

4. The method of claim 1, further comprising:
modifying the email by including a link to the calendar entry or modifying the calendar entry by including a link to the email.

5. The method of claim 1, wherein the description of the associated meeting with the web conference includes at least one of names of participants invited to the associated calendar entries, names of participants who attended the associated meeting, names of participants invited who did not attend the associated meeting, and details of the associated meeting.

6. The method of claim 1, further comprising:
prompting a user to determine how or if the user wants to share the recording with other users.

7. The method of claim 1, wherein the extracting information from the received email further comprises:
extracting from the received email: a timestamp of the email, a length of the recording, and a web conference URL; and
extracting from the calendar of the user: an end time of the calendar entries and a length of the calendar entries.

8. A computer system for modifying an email associated with a meeting replay, the computer system comprising:
one or more processors, one or more computer-readable memories, one or more computer-readable tangible storage media, and program instructions stored on at least one of the one or more tangible storage media for execution by at least one of the one or more processors via at least one of the one or more memories, wherein the computer system is capable of performing a method comprising:
associating a meeting with a web conference;
monitoring a user email client for a receipt of an email containing a recording and detail of the recording after the web conference ends;
extracting information from the received email containing a recording and detail of the recording;
matching information extracted from the received email with calendar entries of a calendar of the user to match the email with the web conference;
determining a matching confidence score based on overlaps of the information extracted from the email and the calendar entries; and
in response to the matching confidence score exceeding a preconfigured confidence score, modifying a subject of the received email and a body of the received email to include a description of the associated meeting with the web conference, thereby creating a modified email.

9. The computer system of claim 8, further comprising:
forwarding the modified email to participants of the associated meeting.

10. The computer system of claim 8, further comprising:
forwarding the modified email to participants who did not attend the associated meeting but who were invited.

11. The computer system of claim 8, further comprising:
modifying the email by including a link to the calendar entry or modifying the calendar entry by including a link to the email.

12. The computer system of claim 8, wherein the description of the associated meeting with the web conference includes at least one of names of participants invited to the associated calendar entries, names of participants who attended the associated meeting, names of participants invited who did not attend the associated meeting, and details of the associated meeting.

13. The computer system of claim 8, further comprising:
prompting a user to determine how or if the user wants to share the recording with other users.

14. The computer system of claim 8, wherein the extracting information from the received email further comprises:
extracting from the received email: a timestamp of the email, a length of the recording, and a web conference URL; and
extracting from the calendar of the user: an end time of the calendar entries and a length of the calendar entries.

15. A computer program product for modifying an email associated with a meeting replay, the computer program product comprising:
one or more computer-readable tangible storage media and program instructions stored on at least one of the one or more tangible storage media, the program instructions executable by a processor of a computer to perform a method, the method comprising:
associating a meeting with a web conference;
monitoring a user email client for a receipt of an email containing a recording and detail of the recording after the web conference ends;
extracting information from the received email containing a recording and detail of the recording;
matching information extracted from the received email with calendar entries of a calendar of the user to match the email with the web conference;
determining a matching confidence score based on overlaps of the information extracted from the email and the calendar entries; and
in response to the matching confidence score exceeding a preconfigured confidence score, modifying a subject of the received email and a body of the received email to include a description of the associated meeting with the web conference, thereby creating a modified email.

16. The computer program product of claim 15, further comprising:
forwarding the modified email to participants of the associated meeting.

17. The computer program product of claim 15, further comprising:
forwarding the modified email to participants who did not attend the associated meeting but who were invited.

18. The computer program product of claim 15, further comprising:
modifying the email by including a link to the calendar entry or modifying the calendar entry by including a link to the email.

19. The computer program product of claim 15, wherein the description of the associated meeting with the web conference includes at least one of names of participants invited to the associated calendar entries, names of participants who attended the associated meeting, names of participants invited who did not attend the associated meeting, and details of the associated meeting.

20. The computer program product of claim 15, wherein the extracting information from the received email further comprises:
extracting from the received email: a timestamp of the email, a length of the recording, and a web conference URL; and
extracting from the calendar of the user: an end time of the calendar entries and a length of the calendar entries.

* * * * *